United States Patent [19]
Wormser

[11] Patent Number: 5,433,408
[45] Date of Patent: Jul. 18, 1995

[54] BANNER SUPPORT ARM LOCK

[75] Inventor: Robert S. Wormser, Ocala, Fla.

[73] Assignee: Ranger International, Inc., Ocala, Fla.

[21] Appl. No.: 137,721

[22] Filed: Oct. 18, 1993

[51] Int. Cl.⁶ .................................................. F16L 3/00
[52] U.S. Cl. ...................... 248/121; 203/394; 411/354
[58] Field of Search .................. 248/121, 219.2, 219.3; 403/297, 315, 320, 400; 411/354

[56] References Cited

U.S. PATENT DOCUMENTS

| | | | |
|---|---|---|---|
| 2,267,523 | 12/1941 | Haversat | 287/49 |
| 4,289,417 | 9/1981 | Mandell | 403/218 |
| 5,267,806 | 12/1993 | Bock | 403/260 |
| 5,269,118 | 12/1993 | Bullaro | 53/315 |

FOREIGN PATENT DOCUMENTS 803798  4/1951  Germany ........................... 403/400

Primary Examiner—Leslie A. Braun
Assistant Examiner—Catherine S. Collins
Attorney, Agent, or Firm—Beaman & Beaman

[57] ABSTRACT

An arm locking system for a vertical banner supporting column having horizontally disposed arms. The tubular column internally receives a nut having resilient fingers permitting unilateral installation of the nut adjacent an arm extending through holes formed in the column. A screw within the nut bears upon the arm forcing the arm against the edges of the associated column holes frictionally positioning the arm and column. A single nut and screw may be used to position a plurality of arms upon the arms being so related that the screw causes engagement of the arms portion's within the column to engage in a frictional relationship forcing the arms into contact with their associated hole edges.

3 Claims, 1 Drawing Sheet

U.S. Patent  July 18, 1995  5,433,408
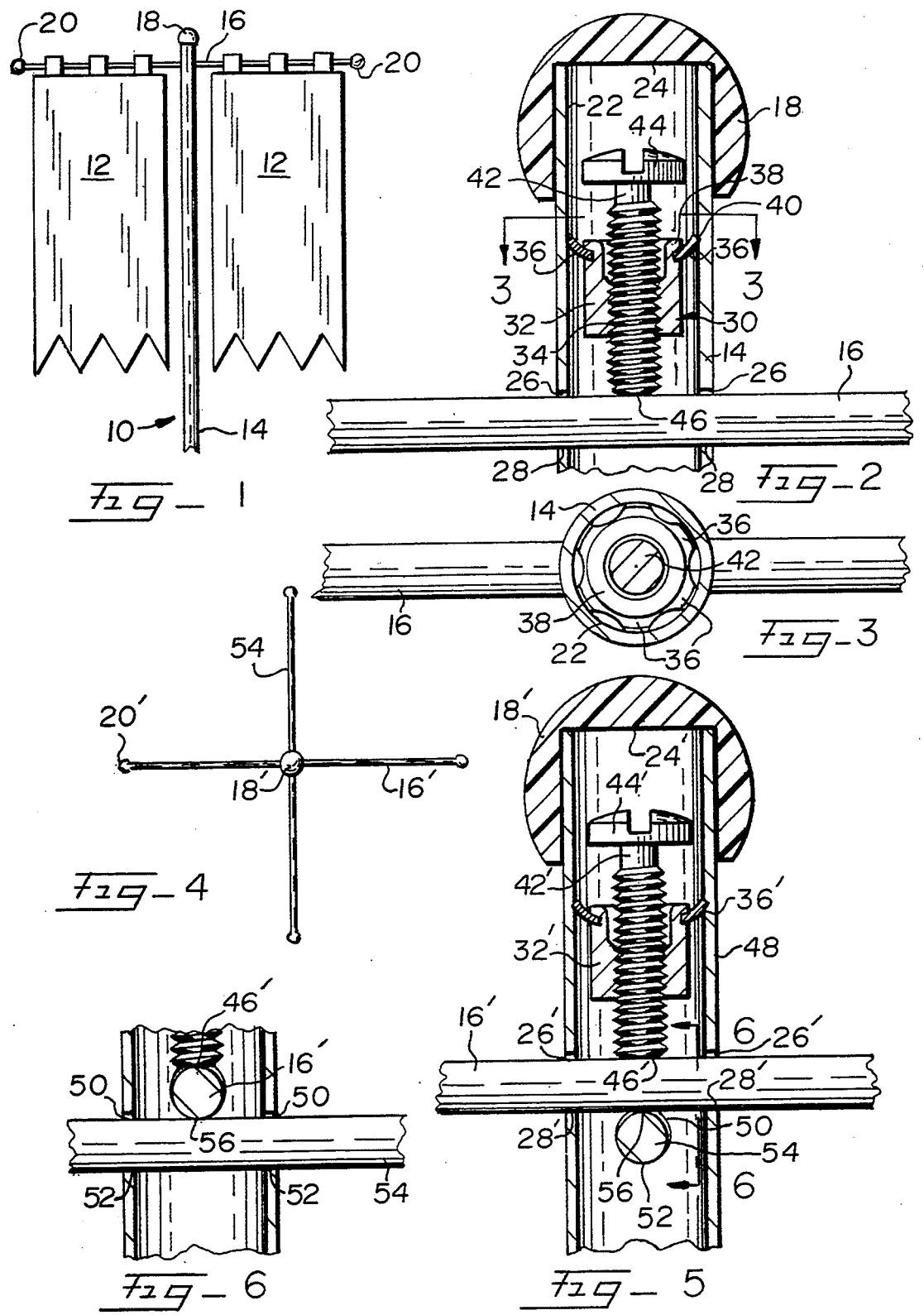

BANNER SUPPORT ARM LOCK

BACKGROUND OF THE INVENTION

1. Field of the Invention

The invention pertains to supports for banners utilizing a vertical column and horizontal arms wherein a set screw arrangement within the column readily locks the arms in the desired position.

2. Description of the Related Art

Banners, signs, tapestries, and the like used in stores and other display locations may use vertically positioned columns having arms extending therefrom in a horizontal manner. The banner or sign may be suspended from the arms. It is necessary to lock the arms relative to the column to prevent inadvertent arm displacement and provide a tight assembly. It is important that such display devices be aesthetically attractive, clean and simple in appearance, and free of projections and edges which may inadvertently snag a banner or sign, or otherwise ham any article suspended from the arms, as clothing, or the like, may also be supported by the column arms.

With devices of this type, the arms are often fitted into the column holes with an interference or press fit, but such installation is difficult and expensive in that accurate assembly and hole forming techniques are required, and when assembling lightweight display columns with force requiring techniques damage to the apparatus may occur, and surfaces may be scratched or otherwise marred. Arm locks using Tinnerman type nuts and washers are also used, but do not produce tight, rattle-free assemblies.

Also, as the banner or sign support must be attractive, yet not distract from the overall appearance of the display, fittings, screws, couplings, and other accoutrements often used with apparatus of this type are undesirable.

OBJECTS OF THE INVENTION

It is an object of the invention to provide a banner arm support and lock for positioning an arm within a tubular column wherein the lock is not exteriorly visible, but may be readily and economically installed within the column.

An additional object of the invention is to provide a banner support arm lock using a nut internally supported within a tubular column employing resilient fingers imbedding into the column material, and a screw located within the nut bears upon an arm transversely disposed to the column and is locked thereto by tightening of the screw.

A further object of the invention is to provide a lock system for banner support arms wherein a plurality of arms may be effectively locked to a column by tightening of a single screw.

SUMMARY OF THE INVENTION

In accord with the invention, a banner, sign, or other article, is supported upon horizontally disposed arms mounted upon a vertically disposed column. Preferably, the column is formed of a tubular extruded aluminum material, and is drilled to form diametrically opposed holes therein. A cylindrical arm extends through the holes having a length perpendicular to the column length, and a lock within the column engages that portion of the arm within the column to prevent axial displacement of the arm relative to the column. This lock takes the form of a nut having resilient spring steel fingers having sharp edges, and the size of the nut and the diameter of the finger ends is such that the nut may be forced into an open end of the column deflecting the fingers such that the finger ends extend toward the open column end as the nut is pushed into the column and imbed into the column material. The nut is spaced adjacent an arm extending diametrically through opposed holes formed in the column. A set screw within the nut is accessible through the open end of the column and upon tightening of the screw the screw will bear against that portion of the arm within the column making frictional contact therewith, and force the arm against the edges of its associated column holes. Such action produces high frictional forces between the column, arm and screw preventing axial displacement of the arm relative to the column forming a tight and rattle-free assembly.

As the set screw is tightened, the sharp edges of the ends of the nut resilient fingers imbed further into the walls of the bore of the column preventing movement of the nut in a direction toward the column open end, and accordingly, it will be appreciated that the nut resilient fingers permit a unidirectional axial movement of the nut within the column, and the nut is incapable of moving in the direction toward the column open end, even under the relatively high axial forces imposed thereon as the set screw is tightened.

The inventive concept may be used to lock two or more arms to the column upon the arms being obliquely related to each other, and located immediately adjacent each other through column holes in an engaging superimposed relationship. Thereupon, by properly positioning the arm supporting holes in the column, and by using pre-determined radial dimensions in the arms, it is possible for a single screw to engage and lock the arm closest to the screw, and the engagement of this arm with the arm immediately disposed therebelow simultaneously locks the lower arm relative to the column, and the tightening of the single screw can be used to lock at least two arms relative to the column, and the concept could be used to lock three or more arms upon the column, if desired.

BRIEF DESCRIPTION OF THE DRAWINGS

The aforementioned objects and advantages of the invention will be appreciated from the following description and accompanying drawings wherein:

FIG. 1 is an elevational view of a typical banner support utilizing the components and concepts of the invention, FIG. 2 is an enlarged detail elevational sectional view of the upper end of a column using the inventive concepts, illustrating the set screw engaging and locking the arm within the column, FIG. 3 is a plan sectional view taken along Section 3—3 of FIG. 2, FIG. 4 is a top plan view of a banner supporting column and arms wherein a plurality of arms are mounted upon a single column, FIG. 5 is an enlarged detail diametrically sectional elevational view of the upper end of the column of FIG. 4 utilizing the concepts of the invention employing a plurality of arms, and FIG. 6 is an enlarged detail diametrical elevational view of the relationship of the column, plurality of arms and set screw shown in FIG. 5 as taken along Section 6--6.

DESCRIPTION OF THE PREFERRED EMBODIMENTS

With reference to FIG. 1, the overall banner support is generally indicated at 10, and the banner support is used to support a pair of banners 12 which may be formed of fabric, plastic or paper and include upper loops for associating with the support arm, as later described.

The primary component of the banner support 10 is the vertically disposed column 14 preferably formed of aluminum by an extruded process, and the exterior surface of the column may be ribbed, or otherwise decoratively configured. The banner support arms 16 are mounted within the column 14, and usually consist of aluminum or steel rod approximately ⅜ of an inch in diameter, and of sufficient length as to extend through the column 14 and sufficiently therebeyond to permit the banner loops to be threaded thereon and the arms will thereby support the banners 12 as illustrated in FIG. 1. Preferably, the upper end of the column 14 is closed by a decorative cap 18, and arm caps 20 may be located upon the ends of the arms for appearance purposes.

As shown in FIG. 2, the column 14 is tubular and includes a cylindrical bore 22 having an upper open end 24 which is closed by the cap 18. The column 14 is provided with a pair of diametrically opposed holes 26 of a diameter slightly greater than the diameter of the arm 16, and the holes 26 each include a lower edge 28 as defined by the wall of the column.

A nut assembly 30 is located within the column bore 22 inwardly of the open end 24, and the nut assembly includes the nut body 32 of a diameter less than the diameter of the bore 22. The body 32 is provided with an axial threaded bore 34, and at its upper regions the nut body 32 is formed with a smaller diameter for receiving the spring steel washer defining the resilient fingers 36. The finger washer is maintained upon the nut body 32 by the rolled lip 38 superimposed over the finger washer, and in this manner the resilient fingers 36 are axially fixed with respect to the nut body 32. The configuration of the fingers 36 will be appreciated from FIG. 3, and the end edges of the fingers as represented at 40 include sharp outer edges for imbedding into the column as later described.

A threaded set screw 42 is received within the nut bore 34, and the set screw includes a slotted head 44 for receiving a screwdriver, and the lower end of the set screw is represented at 46.

In use, the column cap 18 is removed providing access to the column bore 22 through end 24, and the nut assembly 30 is axially forced into the column open end within the bore 22. By exerting sufficient axial force on the nut assembly 32 the outer ends of the fingers 36 will engage the column bore 22 and be deflected toward the column open end 24 as shown in FIG. 2. In this manner, because the normal diameter of the fingers 36 is greater than the diameter of the bore 22, the ends of the fingers 36 will scrape along the bore 22 while deflected upwardly as shown in FIG. 2, and the nut body may be inserted into the bore 22 to the distance desired.

Of course, the nut body 32 is not inserted into the bore 22 beyond the holes 26. Rather, the preferred positioning of the body 32 is slightly above the holes 26 as shown in FIG. 2. Once the nut body 32 is so positioned, the set screw 42 is threaded into the nut bore 34, if this assembly has not previously occurred, and the nut body 32 will be so located relative to the column open end 24 as to easily permit a blade screwdriver to be inserted through the column open end for rotating the set screw.

If the arm 16 has not already been placed within the column holes 26, the arm will be inserted through the holes 26 and axially positioned within the holes as desired. Thereupon, the set screw 42 may be rotated by a screwdriver, not shown, and the set screw end 46 will engage the arm 16 and force the arm into a frictional locking relationship with the hole lower edges 28. It will therefore be appreciated that tightening of the screw 48 will frictionally interconnect the column 14 and arm 16 and provide a rattle-proof assembly, and prevent axial displacement of the arm 16 within the holes 26.

During tightening of the set screw 42, upward movement of the nut assembly 30 within the column bore 22 is prevented due to the fact that the sharp finger edges 40 will imbed into the material of the column and prevent such axial displacement between the column and nut assembly. As previously mentioned, the fingers 36 are preferably formed of a spring steel, which is considerably harder than the preferred aluminum construction of the column 14, and the finger ends 40 will readily imbed into the column material sufficiently to prevent axial movement of the nut assembly toward the column open end 24.

Placement of the cap 18 over the column open end 24 will hide the nut assembly from view, and the aforedescribed components permit the arm 16 to be securely locked relative to the column 14 in a high strength mechanical manner, and yet no locking mechanism is exteriorly visible.

If it is desired to remove the arm 16 from the column 14, it is only necessary to remove column cap 18, and unthread screw 46 to disengage the screw from the arm 16, and thereupon the arm 16 may be pulled from the holes 26.

FIGS. 4–6 illustrate another embodiment of the invention wherein two arms are mounted upon a single column, and in the description of this embodiment, components identical to those previously described are indicated by primed reference numerals.

The column 48 is identical in construction to the column 14 except that a second set of diametrically opposed holes 50 are located below the holes 26', and the axis of the holes 50 is at right angles to the axis of the holes 26, as will be appreciated from FIGS. 5 and 6.

The holes 50 include lower edges 52, and a second arm 54 identical to arm 16' is received within the holes 50.

The axial dimension spacing and location of the hole edges 28' and 52 is equal to the diameter of the arm 54. Accordingly, upon the arm 16' being located within the column 48 as desired, and the set screw 42' is rotated to engage the set screw end 46' with the arm 16' the uppermost portion of the arm 54 will be in axial alignment with the hole edges 28', and engagement between the arms 16' and 54 will occur at 56, FIGS. 5 and 6. Accordingly, as the set screw 42' is tightened against the arm 16', the arm 54 will also be forced against the hole edges 52 and in this manner the set screw 42' will serve to lock both the arms 16' and 54 with respect to the column 48. It will also be appreciated that a slight downward bending may occur in the arm 16' between the edges 28', and such downward deflection of this central portion of the arm 16' will aid in producing a high and effective frictional engagement at 56 with the arm 54, as well as force the arm 54 into firm engagement with the column edges 52.

It will be appreciated that the dimensional concepts of the holes 26' and 50 would apply if three sets of arm receiving holes were formed in a column and dimensioned apart a distance equal to the diameter of the arms so that three obliquely related arms could be simultaneously attached to a column by the operation of a single set screw.

It is appreciated that various modifications to the inventive concepts may be apparent to those skilled in the art without departing from the spirit and scope of the invention.

I claim:

1. In combination, a banner support including a tubular column having an axis, an end, and a wall having an inner surface having a diameter and an elongated arm extending through a first set of diametrically opposed holes defined in said column wall having lower edges and transversely related to said column axis, a barrier support arm lock including a nut having a body having an outer diameter, a first end, a second end and a central threaded bore, said nut outer diameter being less than the diameter of said column inner surface and said nut being received within said column wall inner surface between said column end and said first set of holes, an annular spring steel washer mounted on said nut body, a deformed lip defined on said nut body affixing said washer to said body, a plurality of resilient flexible radial fingers defined on said washer having ends engaging said column inner surface permitting axial insertion of said nut body into said column inner surface and preventing rotation and reverse axial nut body displacement once positioned adjacent said arm, a screw received within said nut body threaded bore having a headed end for receiving a torque driver and an abutment end engaging said arm to force said arm against the lower edges of its associated column holes to lock said arm against axial displacement relative to said column, said screw headed end being located within said column axially spaced from said column end.

2. In a combination as in claim 1, a second set of diametrically opposed holes defined in said column wall having lower edges, said second set of holes being located upon the opposite side of said arm with respect to said nut and defining an aligned axis obliquely disposed to the length of said arm, a second elongated arm located in said second set of holes having a diameter of such dimension that said second arm simultaneously engages the adjacent portion of said first mentioned arm and the lower edges of said second set of holes whereby force applied to said first mentioned arm by said screw causes said first mentioned arm and said second arm to engage and forces said second arm into frictional engagement with its associated second set lower hole edges to lock said second arm within said second set of column holes.

3. In a combination as in claim 2, the diameter of said second arm being substantially equal to the axial spacing of said first and second sets of holes lower edges with respect to the length of said column.

* * * * *